(12) United States Patent
Druker et al.

(10) Patent No.: US 10,599,020 B2
(45) Date of Patent: Mar. 24, 2020

(54) SWIVEL CAMERA MOUNT LOCKING MECHANISM

(71) Applicant: GoPro, Inc., San Mateo, CA (US)

(72) Inventors: Joshua Todd Druker, Redwood City, CA (US); Christopher Aaron Clearman, Half Moon Bay, CA (US)

(73) Assignee: GoPro, Inc., San Mateo, CA (US)

( * ) Notice: Subject to any disclaimer, the term of this patent is extended or adjusted under 35 U.S.C. 154(b) by 10 days.

(21) Appl. No.: 15/872,059

(22) Filed: Jan. 16, 2018

(65) Prior Publication Data

US 2019/0025675 A1    Jan. 24, 2019

Related U.S. Application Data

(63) Continuation of application No. 15/250,898, filed on Aug. 29, 2016, now Pat. No. 9,904,148.

(51) Int. Cl.
| | |
|---|---|
| G03B 17/56 | (2006.01) |
| F16M 11/06 | (2006.01) |
| F16M 13/02 | (2006.01) |
| F16M 13/00 | (2006.01) |
| F16M 13/04 | (2006.01) |
| F16M 11/10 | (2006.01) |
| F16M 11/20 | (2006.01) |
| F16M 11/04 | (2006.01) |
| F16M 11/16 | (2006.01) |

(52) U.S. Cl.
CPC ......... *G03B 17/561* (2013.01); *F16M 11/041* (2013.01); *F16M 11/06* (2013.01); *F16M 11/10* (2013.01); *F16M 11/16* (2013.01); *F16M 11/2014* (2013.01); *F16M 13/00* (2013.01); *F16M 13/02* (2013.01); *F16M 13/04* (2013.01); *G03B 17/566* (2013.01); *F16M 2200/024* (2013.01)

(58) Field of Classification Search
CPC .............................. G03B 17/00; G03B 17/56
USPC ....................... 396/428; 348/376; 248/178.1
See application file for complete search history.

(56) References Cited

U.S. PATENT DOCUMENTS

| | | | |
|---|---|---|---|
| 9,904,148 B1 * | 2/2018 | Druker | ................. G03B 17/561 |
| 2009/0003821 A1 | 1/2009 | Son | |
| 2011/0260022 A1 | 10/2011 | Lin | |

(Continued)

*Primary Examiner* — Clayton E. LaBalle
*Assistant Examiner* — Fang-Chi Chang
(74) *Attorney, Agent, or Firm* — Young Basile Hanlon & MacFarlane, P.C.

(57) ABSTRACT

A swivel mount locking apparatus is configured to mount a camera system onto a target user, an object, or a surface. The camera system is mounted on a swivel component which can be rotated to a variety of different positions relative to a base component. To fix the camera position, a locking protrusion of a release lever in the base component is compressibly inserted into a detent located on the swivel component. When a new orientation of the camera system is desired, a user may forcibly pivot the release lever away from the swivel component to decouple the locking protrusion from the detent. The user can then rotate the mounted camera system and the swivel component to the new orientation relative to the base component. At the new orientation, the user may recouple the locking protrusion of the release lever into a different detent of the swivel component, thereby fixing the camera system into the desired, new orientation.

18 Claims, 7 Drawing Sheets

(56) References Cited

U.S. PATENT DOCUMENTS

2012/0324682 A1* 12/2012 Ballentine ............ F16B 7/1454
24/535
2013/0184033 A1 7/2013 Willenborg \* cited by examiner

SWIVEL CAMERA MOUNT LOCKING MECHANISM

CROSS-REFERENCE TO RELATED APPLICATION(S)

This application is a continuation of U.S. patent application Ser. No. 15/250,898, filed Aug. 29, 2016, which is hereby incorporated by reference in its entirety.

BACKGROUND

Technical Field

This disclosure relates to camera mounts, and more specifically, to a rotatable locking camera mount system.

Description of the Related Art

Digital cameras are often mounted to a device worn by a user (e.g. helmet, wrist mount) to enable the capture of pictures or videos. However, once mounted, digital cameras are locked in a particular orientation determined by the mount, thereby making it difficult to capture pictures or videos that are not located in a line of sight of the camera's particular orientation. For example, if a camera is mounted on a helmet worn by a user, the user must rotate his/her head to achieve a different camera line of sight that encompasses the desired target. Similarly, if the camera is mounted on a user's wrist, the user must alter the positioning of his/her wrist. However, requiring a physical change in a user's body orientation may be inconvenient or dangerous in particular environments.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

A camera system includes a camera mounted on a lower mount component, which in turn, is coupled to a swivel mount locking apparatus. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions.

A swivel camera mount locking apparatus includes a rotatable swivel component. The top face of the swivel component couples with the camera system in order to mount and lock the camera system in a particular orientation, enabling the camera to remain stable when capturing images. The swivel component includes a release lever with a locking protrusion, and the bottom face of the swivel component includes multiple detents oriented in a circular fashion, each detent designed to reciprocally receive the locking protrusion of the release lever. Therefore, a user can place the camera system in a particular orientation by rotating the swivel component to that desired orientation, and engaging the locking protrusion of the release lever with a corresponding detent on the swivel component. In various embodiments, the release lever can be separated from the swivel component by applying a downward force on one end of the release lever, causing the release lever to forcibly pivot away from the swivel component. The camera system may be placed in a different orientation by rotating the swivel component and inserting the locking protrusion of the release lever with a different detent on the swivel component.

Example Camera System Configuration

Figure 1:
FIG. 1 illustrates a camera system, according to one example embodiment.

FIG. 1 illustrates a camera system 100, according to one example embodiment. A camera 105 is included within the camera system 100 described herein, according to one example embodiment. The camera 105 is configured to capture images and video, and to store captured images and video for subsequent display or playback. The camera may be enclosed within a camera frame 110, which in turn is coupled to a lower mount component 150 via the turnable handscrew 130. A first plurality of protrusions of the camera frame 140 is inserted between a second plurality of protrusions of the lower mount component 150. Each protrusion of the first plurality of protrusions and the second plurality of protrusions includes a hole, and the turnable handscrew 130 is inserted through the aligned holes, pivotally coupling the camera frame 110 to the lower mount component 150. The camera frame 110 includes a latch mechanism 120 configured to enable a first portion of the camera frame coupled to a first portion of the latch mechanism to flexibly separate from a second portion of the camera frame coupled to a second portion of the latch mechanism when the latch mechanism is configured in an open configuration (the configuration illustrated in FIG. 1), thereby enabling a user to insert a camera 105 into or remove a camera 105 from the camera frame 110. The latch mechanism 120 can also be configured in a closed configuration, thereby securing a camera 105 within the camera frame 110.

Figure 2A:
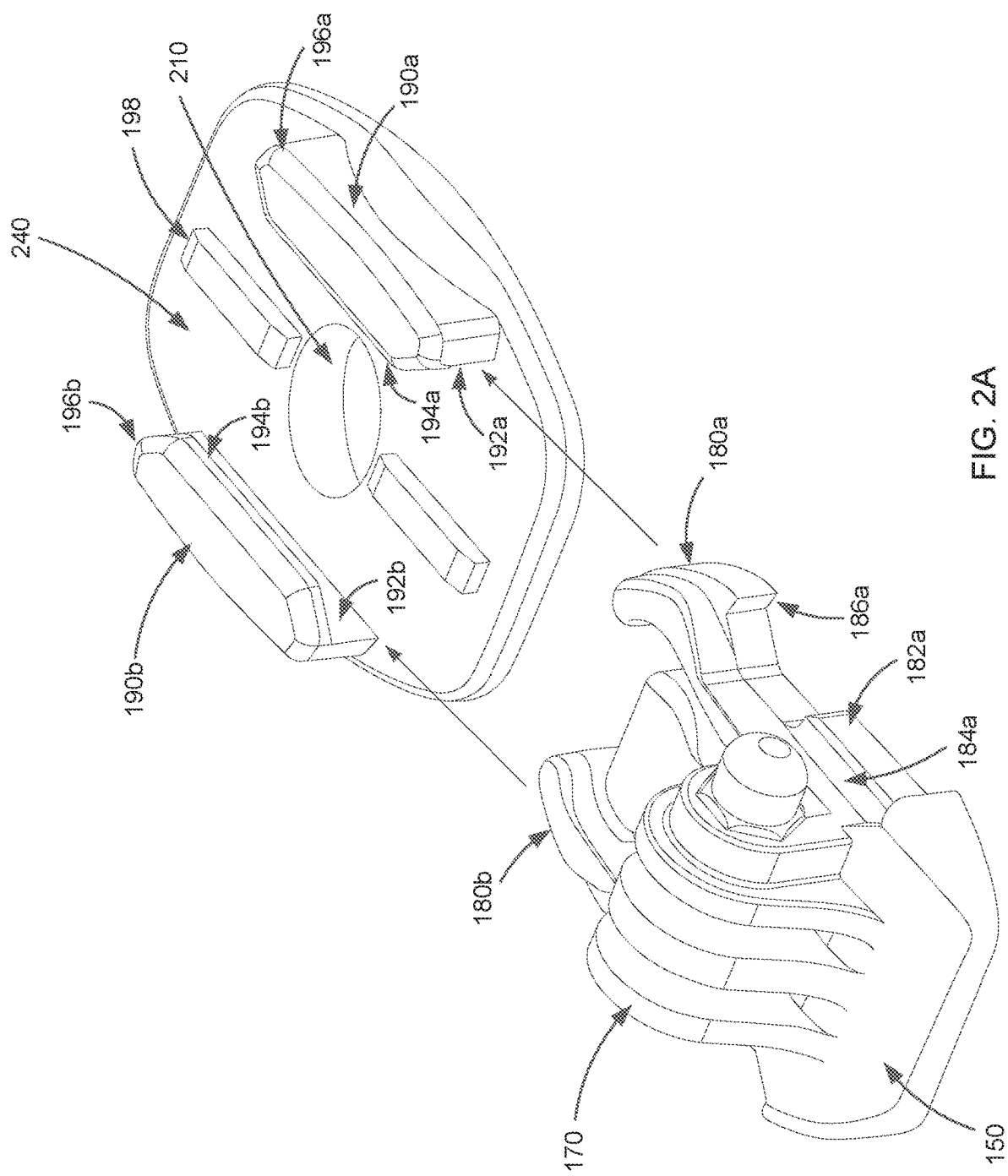
FIG. 2A illustrates a lower mount component decoupled from a swivel component, according to one embodiment.

FIG. 2A illustrates a lower mount component 150 decoupled from a swivel component 240, according to one embodiment. The lower mount component 150 includes a plurality of protrusions 170. In some embodiments, the plurality of protrusions 170 are configured to interlock with the plurality of protrusions 140 of the camera frame 110 of FIG. 1 such that the holes in each protrusion in the sets of protrusions align. When a screw or pin is inserted into the aligned holes, the camera frame 110 can be rotatably secured to the lower mount component 150.

The lower mount component 150 also includes two prongs 180a and 180b that can be flexibly compressed inward when squeezed. The prongs 180a and 180b include side securing surfaces 182a and 182b (not shown), top securing surfaces 184a and 184b, and securing lips 186a and 186b (not shown), respectively. The swivel component 240 includes securing arms 190a and 190b, each with side securing surfaces 192a and 192b, top securing surfaces 194a and 194b, and back securing surfaces 196a and 196b, respectively. The swivel component 240 additionally includes two spines 198 and a hole 210 located at the center of the swivel component 240. The assembly of the swivel camera mount locking apparatus is described in FIG. 3.

Figure 2B:
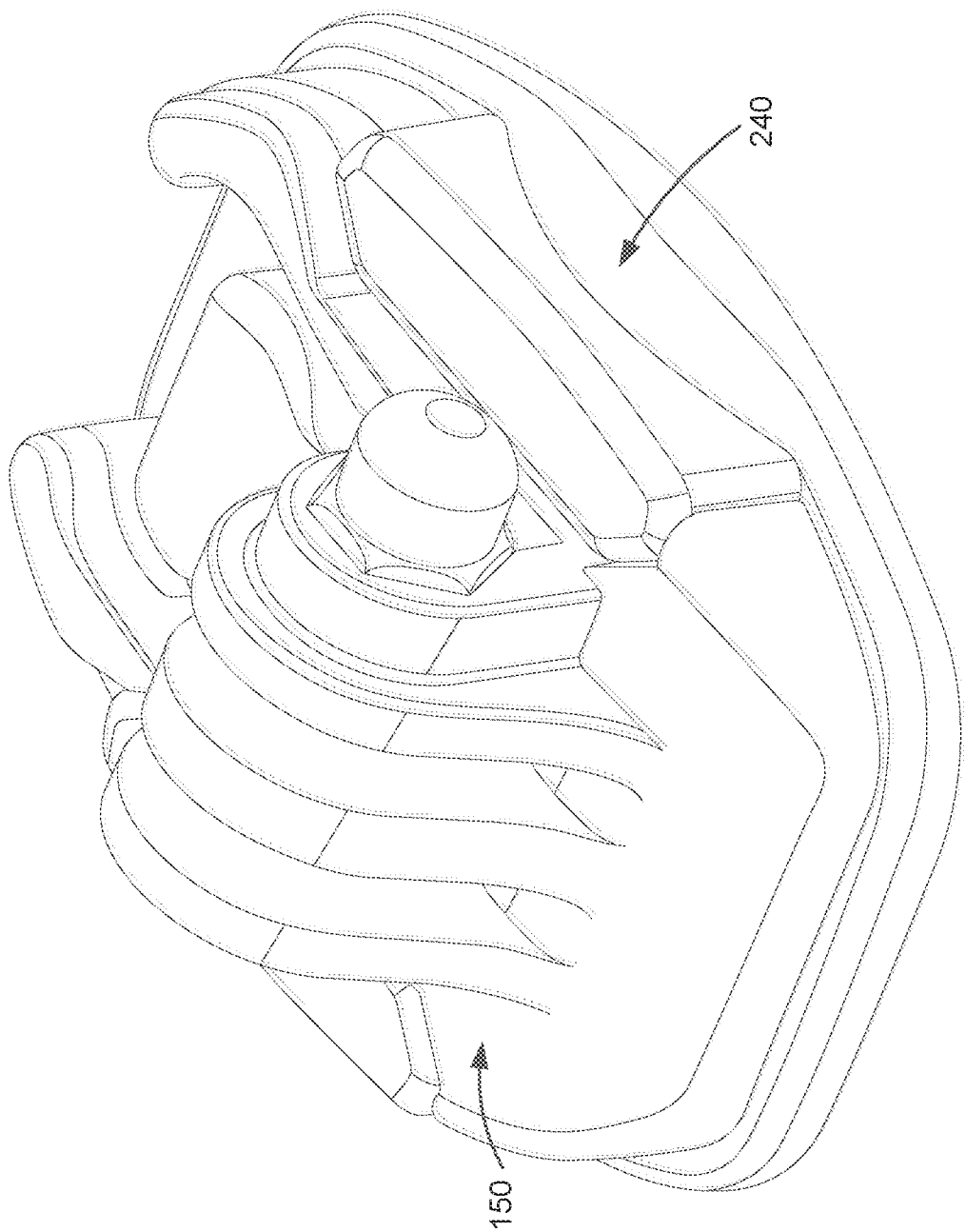
FIG. 2B illustrates a lower mount component coupled to a swivel component, according to one embodiment.

When the prongs 180a and 180b of the lower mount component 150 are squeezed together, the width of the prong-side of the lower mount component is reduced to less than the width between the securing arms 190a and 190b, such that the lower mount component 150 can be slid onto the swivel component 240. When the lower mount component 150 is slid onto the swivel component 240, the side securing surfaces 182a and 182b make contact with and slide along the side securing surfaces 192a and 192b, respectively. Similarly, the top securing surfaces 184a and 184b make contact with and slide along the top securing surfaces 194a and 194b, respectively. When the lower mount component 150 is completely slid into the swivel component 240, the securing arms decompress outward when the securing lips 186a and 186b are slid past the back securing surfaces 196a and 196b. The securing arms flexibly exert force outward such that the securing lips extend outwards and make contact with the back securing surfaces or overlap at least partially with the back securing surfaces, preventing the lower mount component 150 from sliding backwards. This securely couples the lower mount component 150 to the swivel component 240 as illustrated in FIG. 2B. The lower mount component 150 can be decoupled from the swivel mount 240 component by compressing the securing arms of the lower mount component such that the width of the prong-side of the lower mount component is again reduced to less than the width between the securing arms of the swivel component, and sliding the lower mount component backwards past the swivel component.

The lower mount component 150 may include a spine groove on the bottom side of the lower mount component 150 to allow for the reciprocal sliding and insertion of the two spines 198 of the swivel mount component 240 into the spine groove when the lower mount component is slid onto and secured to the swivel component. The spine of the swivel component exerts a force upwards on the lower mount component, forcing the lower mount component upward such that the top securing surfaces 184a and 184b are forced upward into the top securing surfaces 194a and 194b.

The upward force of the lower mount component 150 into the top securing surfaces 194a and 194b of the securing arms 190a and 190b result in the vertical securement of the lower mount component 150 onto the swivel component 240. In other words, by forcing the lower mount component 150 upwards, the spine 198 prevents any up or down motion by the lower mount component 150 relative to the swivel component 240. In addition, the upwards force exerted by the spine 198 into the lower mount component 150 (the force exerted by the top securing surfaces 182a and 182b into the top securing surfaces 192a and 192b, respectively), in combination with the coefficient of friction between both the top securing surfaces 182a and 192a and the top securing surfaces 182b and 192b, results in a friction force between the lower mount component 150 and the swivel component 240. The friction force prevents any horizontal movement of the lower mount component relative to the base mount component resulting from horizontal forces on the lower mount component less than the friction force. Thus, the spine 198 secures the lower mount component 150 onto the swivel component 240 by preventing both the vertical and the horizontal movement of the lower mount component 150 relative to the swivel component 240.

It should be noted in alternative embodiments, the lower mount component 150 is configured to securely couple to the swivel component 240 using other means than those described with regards to FIGS. 2A and 2B. For example, the lower mount component 150 can include a securing protrusion on the bottom side of the lower mount component configured for insertion into a reciprocal opening within the swivel component 240, and secured using, for example, a securing pin or other locking mechanism. Similarly, the securing arms 190a and 190b of the base mount component can be compressible or flexible such that the arms can be squeezed apart, the lower mount component 150 can be slid onto the swivel component 240, and the arms can be released, securely coupling the lower mount component 150 to the swivel component 240. The lower mount component 150 can be securely coupled to the swivel component 240 using adhesives, buttons, ties, latches, springs, or any combination of the mechanisms described herein. Any other suitable securing mechanism can be used to secure the lower mount component 150 to the swivel component 240. In addition, as will be described below in greater detail, the lower mount component 150, the swivel component 240, or both can be configured to detach such that a camera frame 110 can decouple from the lower mount component 150 or such that the lower mount component 150 can decouple from a swivel component 240 in response to a force exerted on the camera frame 110, the lower mount component 150, the swivel component 240, or any combination thereof.

Example Swivel Camera Mount Locking Apparatus

Figure 3:
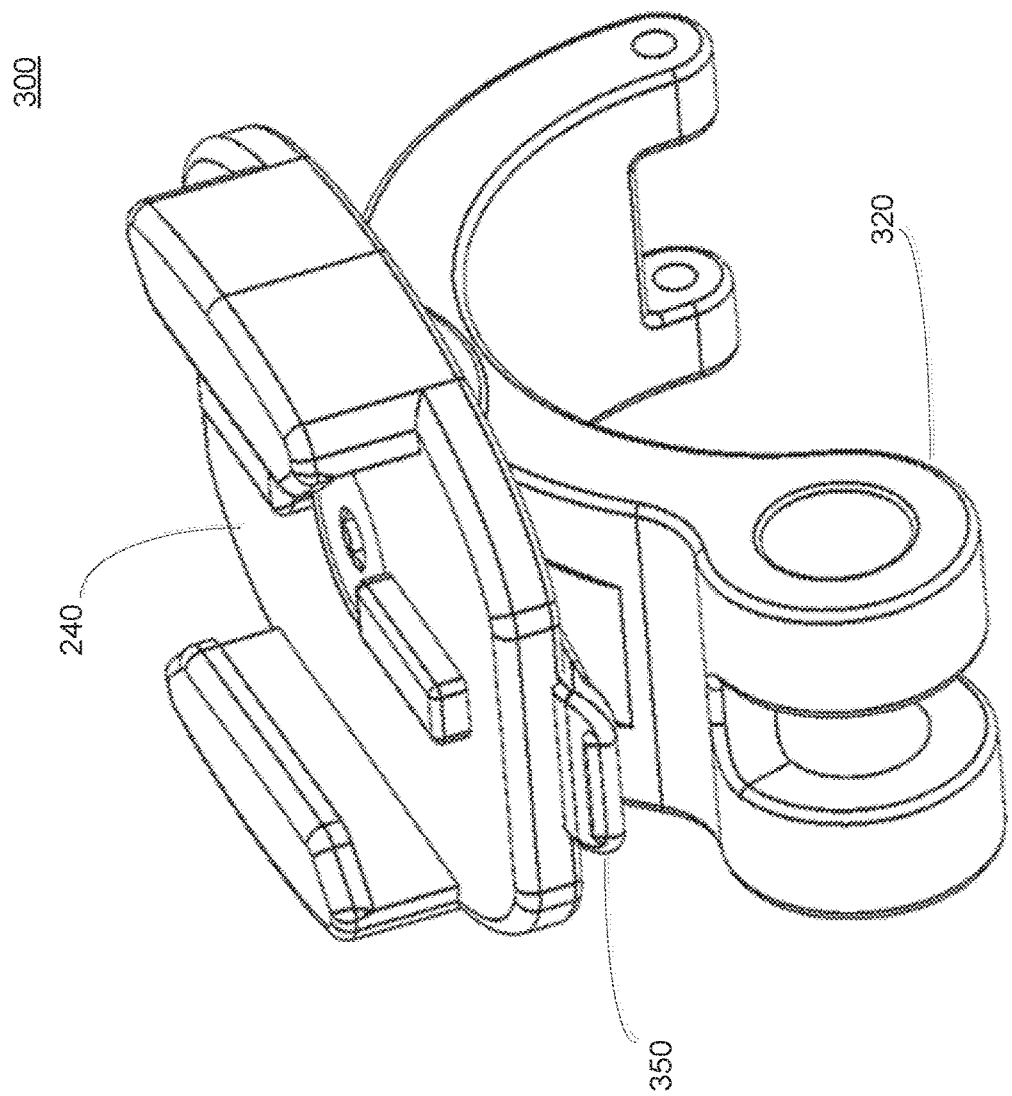
FIG. 3 illustrates an assembled swivel mount locking apparatus, according to one embodiment.

FIG. 3 illustrates an assembled swivel mount locking apparatus 300, according to one embodiment. The swivel mount locking apparatus includes the swivel component 240, a release lever 350 that is rotatably locked relative to the swivel component 240, and a wrist clamp 320 that is in contact with the bottom of the release lever 350. The swivel mount locking apparatus 300 is able to receive the camera system 100 as illustrated in FIG. 1 by sliding the lower mount component 150 into the swivel component 240 as illustrated in FIG. 2A. The wrist clamp 320 may be situated on a wrist of a user and secured in a reciprocal device. It should be noted that in some embodiments, the swivel mount locking apparatus 300 includes a mounting base other than the wrist clamp 320 for rotatably coupling a camera to other portions of a user, or to sports equipment or other objects or surfaces according to the principles described herein.

In various embodiments, one end of the release lever 350 of the fully assembled swivel mount locking apparatus 300 extends out from underneath the swivel component 240. This end of the release lever 350 can receive a downward force from a user that forcibly pivots the release lever 350 downward and away from the swivel component 240, thereby separating the release lever 350 from the swivel component 240. Conversely, the release lever 350 may receive an upward force from a user (or may forcibly compress upward and into the swivel mount component 240 without input from a user) to compress the release lever 350 into an available detent of the swivel component 240. Further detail of the rotating and locking process is described below.

Figure 4:
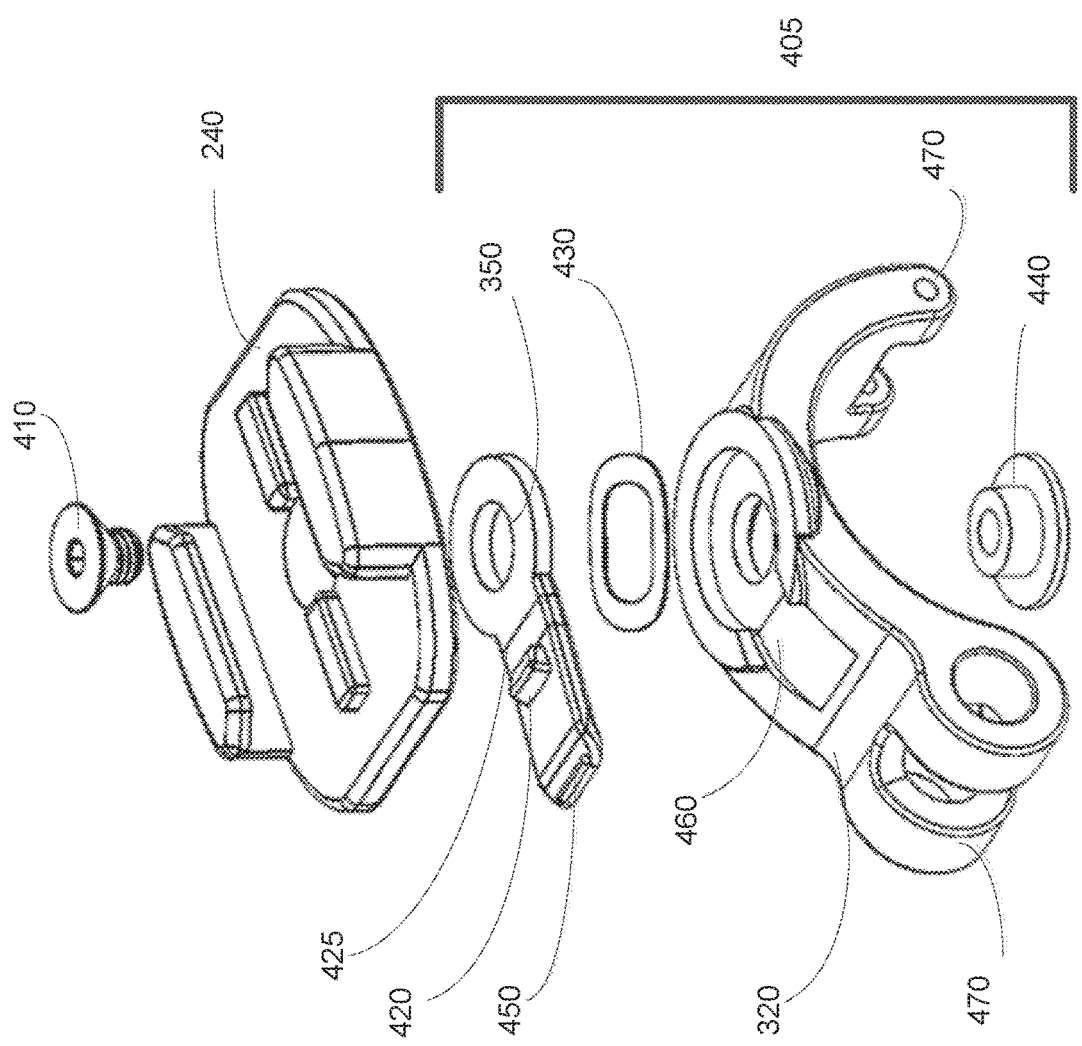
FIG. 4 illustrates an exploded view of the swivel mount locking apparatus, according to one embodiment.

FIG. 4 illustrates an exploded view of the swivel mount locking apparatus 300, according to one embodiment. In various embodiments, the individual pieces of the swivel mount locking apparatus 300 include a screw 410, the swivel component 240, the release lever 350, a rippled washer 430, a wrist clamp 320, and an insert component 440. The release lever 350, rippled washer 430, and wrist clamp 320 are collectively referred to herein as the base component 405.

The screw 410 is designed to be coupled to the insert component 440 through a hole of each of the swivel component 240, the release lever 350, the rippled washer 430, and the wrist clamp 320, thereby holding the components of the swivel mount locking apparatus 300 together. In one embodiment, the end of the screw 410 is threaded and tightened by rotating into the insert component 440. In other embodiments, the screw 410 has a diameter that allows it to enter into a reciprocal cavity of the insert component 440 and remain in circumferential contact with the walls of the cavity of the insert component 440. Thus, the end of the screw 410 remains coupled with the insert component 440 as the frictional force between the screw 410 and insert component 440 prevents vertical slippage.

In various embodiments, the screw 410 may be a flathead, so as to prevent the head of the screw 410 from protruding above the top surface of the swivel component 240. Additionally, the screw 410 vertically stabilizes the swivel mount locking apparatus 300 but allows the swivel component 240 to rotate around the center hole 210 relative to the base component 405.

The release lever 350 has a first end 450 that is designed to receive a downward force from a user. As previously described, the first end 450 may be designed to extend out from underneath the swivel component 240 when fully assembled. In various embodiments, the first end 450 is further tactilely designed to improve the ease with which a user can apply a downward force. For example, the first end 450 may be downwardly angled 45 degrees from the horizontal plane. In another example, the first end 450 may include a rippled grip. As illustrated in FIG. 4, the first end 450 has multiple etches that traverse the surface of the first end 450 of the release lever 350. Therefore, a user can readily differentiate the first end 450 of the release lever 450 from other components of the swivel mount locking apparatus 300 through physical contact.

In various embodiments, the release lever 350 includes a locking protrusion 420 positioned on the top face of the release lever 350. When the swivel mount locking apparatus 300 is assembled, the locking protrusion 420 enters into a reciprocal detent located on the swivel component 240 when the swivel mount locking apparatus is configured in a locked configuration, thereby locking the relative positioning of the release lever 350 to the swivel component 240.

The opposing, second end of the release lever 350 includes a circular hole that the screw 410 passes through to vertically lock the base component 405 relatively to the other components of the swivel mount locking apparatus 300. In various embodiments, the release lever 350 may include a middle region 425 between the locking protrusion 420 and the second end that may be structurally reinforced or composed of a different material. As the release lever 350 flexes in response to a downward force, the middle region bears the brunt of the angular flexion. Structurally reinforcing the middle region 425 of the release lever 350 prevents mechanical failure of the release lever 350 over repeated applications of the downward force input.

A rippled washer 430 is situated between the release lever 350 and a cavity in the wrist clamp 320. In various embodiments, the rippled washer 430 is contoured along its circumference. For example, the circumference of the rippled washer 430 may have a particular curvature (e.g. wavy) to ensure that only parts of the top surface of the rippled washer 430 are in contact with the release lever 350 when the swivel mount locking apparatus 300 is assembled. Thus, in certain locations, there are gaps between the top surface of the rippled washer 430 and the release lever 350. These gaps enable the release lever 350 to sufficiently deflect when a downward force input is received on the first end 450. The center of the rippled washer 430 is a hole that the screw 410 passes through to fixably hold the base component 405.

The wrist clamp 320 is designed to receive the rippled washer 430 in a top cavity. In various embodiments, the cavity is shaped so that the outer circumference of the rippled washer 430 is in contact with the walls of the cavity of the wrist clamp 320. This further prevents the rippled washer 430 from laterally shifting when the swivel mount locking apparatus 300 is assembled.

In various embodiments, the wrist clamp 320 may be coupled to a reciprocal attachment on a user's wrist (not shown). In other embodiments, the wrist clamp 320 may be coupled to an object (e.g. a helmet, a vehicle). In some embodiments, the wrist clamp 320 is configured to be mounted to a pole of various diameters. For example, the wrist clamp 320 may have multiple protrusions 470 that have substantially aligned holes. A screw or pin may be inserted into the aligned holes of the protrusions 470 to fix the wrist clamp 320 to a user or an object such as a pole.

In some embodiments the wrist clamp 320 also includes a curved cavity 460 that is designed to receive the first end 450 of the release lever 350 when a downward force input is applied on the first end 450. The curved cavity 460 provides a sufficient opening for the release lever 350 to flexibly deform and separate the locking protrusion 420 from the swivel component 240. As noted above, in some embodiments, the swivel mount locking apparatus 300 includes a component other than the wrist clamp 320 to secure the swivel mount locking apparatus 300 to an object, user, or surface.

Rotating and Locking the Swivel Component

Figure 5B:
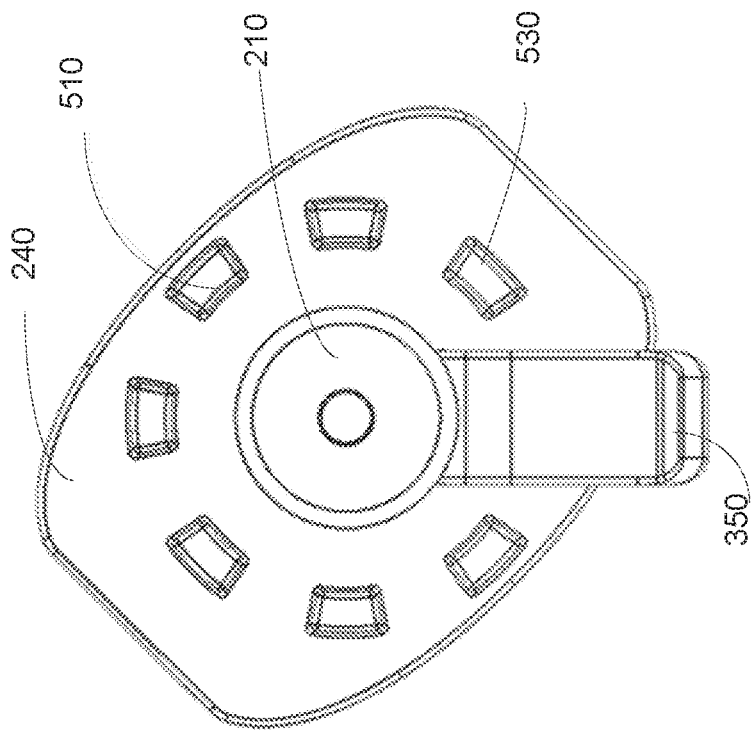
FIG. 5B illustrates a bottom view of the release lever rotatably locked relative to the swivel component in a rotated configuration, according to one embodiment.
Figure 5A:
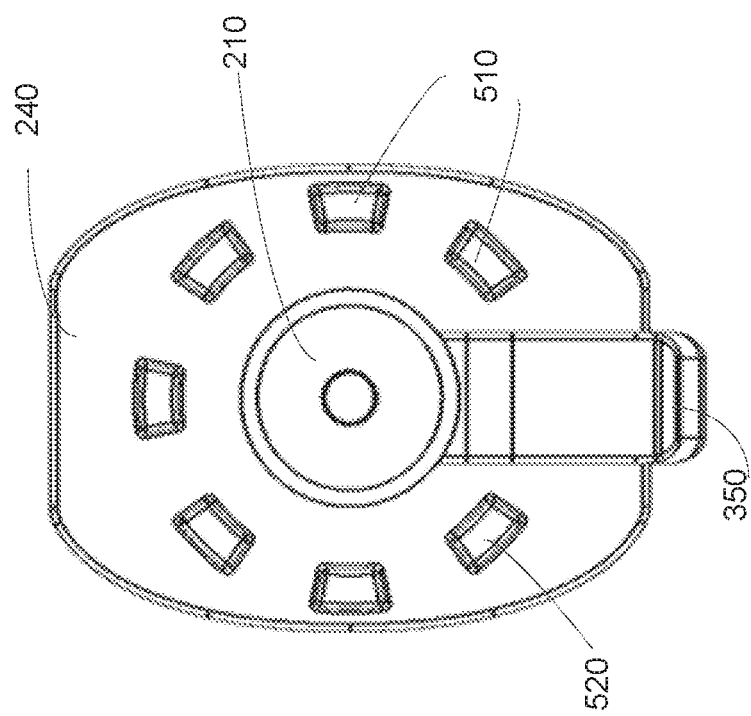
FIG. 5A illustrates a bottom view of the release lever rotatably locked relative to the swivel component, according to one embodiment.

FIG. 5A illustrates a bottom view of the release lever 350 rotatably locked relative to the swivel component 240, according to one embodiment. In various embodiments, the bottom face of the swivel component 240 includes multiple detents 510 that are each located equidistant from the center of the swivel component 240 (e.g. center of the hole 210). The distance of each detent 510 from the center of the swivel component 240 is equal to the distance between the locking protrusion 420 of the release lever 350 and the center of the circular hole on the release lever 350. This enables the locking protrusion 420 to insert into a detent 510 while also substantially aligning the circular hole on the release lever 350 with the circular hole 210 of the swivel component 240. When the swivel mount locking apparatus 300 is fully assembled (e.g. when the locking protrusion 420 of the release lever 350 is inserted into a detent 510 on the swivel component 240), the swivel component is rotatably affixed relative to the base component 405 of the swivel mount locking apparatus 300. In this configuration, the locking protrusion 510 of the release lever 350 exerts a compressive force into the bottom face of the swivel component 240 such that if the swivel component 240 receives a rotational force from the user, the locking protrusion 420 abuts the sides of the detent 510, preventing the rotation of the swivel component 240 relative to the base component 405.

As depicted in FIG. 5A, there are eight total detents 510. All detents on the bottom surface of the swivel component 240 are generally referred to herein as detents 510. Furthermore, individual detents 520 and 530 are referenced by their respective numbers.

In various embodiments, the eight total detents 510 are equally spaced around the center circle 210 (e.g. 45 degree rotation between each detent 510). In the embodiment of FIG. 5A, seven of the detents are available and one is currently occupied by the locking protrusion 420 of the release lever 350. One may appreciate that there may be more or fewer detents available, and the detents 510 may be arranged in configurations other than that illustrated herein. In another embodiment, instead of eight discrete detents 510, as is the case in FIG. 5A, the bottom surface of the swivel component 240 may have a single continuous, circular detent designed to receive the locking protrusion 420 at any point along the circular path. Thus, when rotatably locked relative to the release lever 350, the swivel component 240 may be situated at any rotational angle between 0 and 360 degrees. In such embodiments, the walls of the circular detent may prevent the locking protrusion 420 from readily separating through frictional forces.

In various embodiments, the shape and design of each detent 510 ensures that the locking protrusion 420 is able to be inserted into any of the detents 510. As depicted in FIG. 5A, each detent is rectangular in shape. However, the detents 510 can be any other suitable shape (such as circular or polygonal). In such embodiments, the detents 510 mirror the shape of the locking protrusion 420 of the release lever 350 to enable insertion of the locking protrusion 420 into the detent 510. The depth of each detent 510 can be, at minimum, the height of the locking protrusion 420. However, the depth of each detent 510 is less than the thickness of the swivel component 240 to ensure that the detents 510 are not exposed on the top surface of the swivel component 240.

In various embodiments, the locking protrusion 420 may be designed with a non-uniform top surface. For example, as depicted in FIG. 4, the edge of the locking protrusion 420 closest to the first end may be substantially elevated compared to the edge of the locking protrusion 420 closest to the circular hole. Similarly, the detent 510 may be designed with a corresponding cavity to receive the substantially elevated edge of the locking protrusion 420. For example, the detent 510 may be substantially deeper along the edge that is farther from the circular hole 210. When inserted into the detent 510, the substantially elevated surface of the locking protrusion 420 may assist in locking the release lever 350 with the swivel component.

In various embodiments, the walls of the locking protrusion 420 are vertically oriented such that, when compressively inserted into a corresponding detent 510, the walls of the locking protrusion 420 are in contact against the walls of the detent 510. In other embodiments, the walls of the locking protrusion 420 are designed with a ramp such that the damage to the locking protrusion 420 would be minimized if the camera system 100 experiences an unexpected force (e.g. is accidentally bumped).

FIG. 5B illustrates a bottom view of the release lever 350 rotatably locked relative to the swivel component 240 in a rotated configuration, according to one embodiment. To achieve the rotated configuration depicted in FIG. 5B from the initial configuration depicted in FIG. 5A, the release lever 350 receives a downward force on a first end 450, configuring the swivel component 240 in a released configuration (e.g. the locking protrusion 420 of the release lever 350 is separated from the detent 530). The swivel component 240 receives a rotational force in a counter clockwise direction (as viewed from the bottom of the swivel component 240). The locking protrusion 420 of the release lever 350 is inserted into an adjacent detent 520 (see FIG. 5A), thus achieving the rotatably locked configuration depicted in FIG. 5B. Therefore, in comparison to the orientation of the swivel component 240 depicted in FIG. 5A, the swivel component 240 in FIG. 5B is rotated 45 degrees in the counter clockwise direction.

Figure 6C:
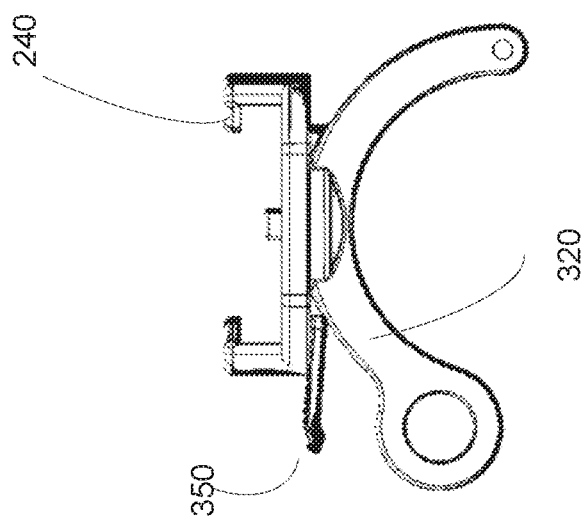
FIG. 6C illustrates a side view of the swivel component in a rotated configuration and rotatably locked relative to the release lever, according to one embodiment.
Figure 6B:
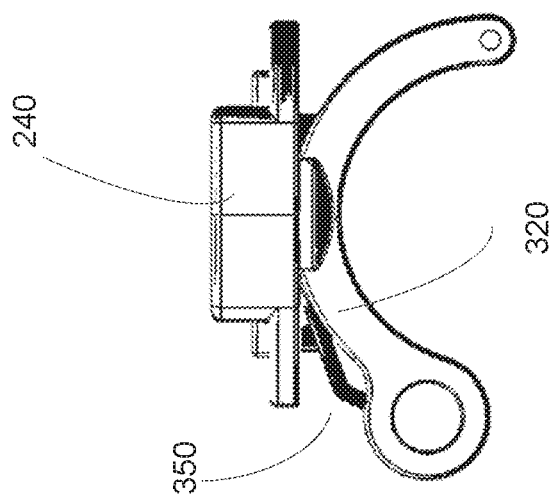
FIG. 6B illustrates a side view of the swivel component and the release lever in a released configuration position, according to one embodiment.
Figure 6A:
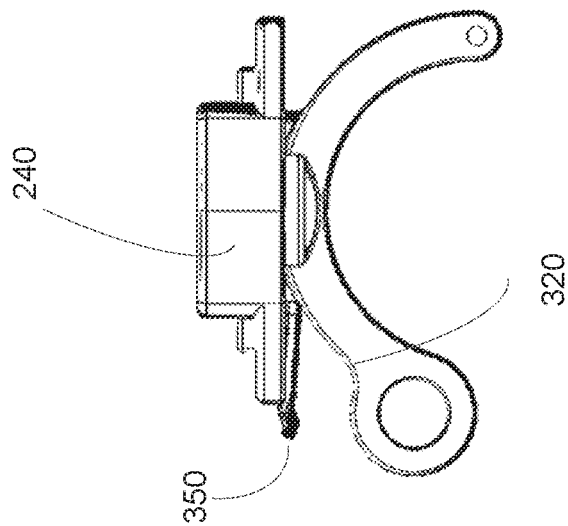
FIG. 6A illustrates a side view of the swivel component rotatably locked relative to the release lever, according to one embodiment.

FIG. 6A illustrates a side view of the swivel component 240 rotatably locked relative to the release lever 350 which is further coupled to the wrist clamp 320, according to one embodiment. When the release lever 350 is rotatably locked relative to the swivel component 240, the locking protrusion 420 of the release lever 350 is inserted into a corresponding detent 510. Additionally, the top face of the release lever 350 forcibly abuts the bottom face of the swivel component 240.

FIG. 6B illustrates a side view of the swivel component and the release lever in a released configuration, according to one embodiment. In various embodiments, the release lever 350 flexibly deforms to the illustrated position after receiving a downward force on the first end 450 of the release lever 350 that causes the release lever 350 to forcibly pivot away from the bottom surface of the swivel component 240. In one embodiment, a continuous application of the downward force is required to hold the release lever 350 in the flexibly deformed position. When the downward force is removed, the release lever 350 may revert to the position illustrated in FIG. 6A. In other embodiments, the release lever 350 may be held in the reciprocal cavity 460 of the wrist clamp 320 even after the downward force is discontinued. For example, the reciprocal cavity may be designed such that when a user compressively forces the release lever 350 into the reciprocal cavity 460, the vertical walls of the reciprocal cavity 460 abut the sides of the release lever 350 and hold the release lever 350 in place through frictional forces.

FIG. 6C illustrates a side view of the swivel component 240 in a rotated configuration and the release lever 350 in a rotatably locked position, according to one embodiment. In this depiction, the swivel component has been rotated 90 degrees relative to the wrist clamp 320. In various embodiments, the user rotates the swivel component 240 (and the attached camera system 100) to the desired rotational position when the release lever 350 is compressed downward.

For example, the user aligns the locking protrusion 420 of the release lever 350 with the desired detent 510 and may provide an additional compressive force to insert the locking protrusion 420 into the detent 510 of the swivel component 240. In various embodiments, the locking protrusion 420 of the release lever 350 may automatically insert into an available detent 510 when aligned and when a downward force being applied to the first end 450 abates.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for smart frames as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera mount comprising:
    a swivel component with a hole through a center of the swivel component, the swivel component comprising:
        a top face, the top face comprising a mount component configured to couple to a reciprocal mount component, the reciprocal mount component configured to couple to a camera housing; and
        a bottom face comprising a plurality of detents on the bottom face, the plurality of detents located equidistant from the hole;
    a base component comprising:
        an attachment mechanism configured to couple the camera mount to an object or user; and
        a release lever protruding from the base component, the release lever comprising a locking protrusion for insertion into one of the plurality of detents, the release lever being resiliently deflectable between a locked position, in which the release lever is configured to exert a compressive force into the bottom face of the swivel component, and an unlocked position; and
    a screw component configured for insertion through the hole of the swivel component, and configured to rotatably couple the swivel component to the base component;
    wherein the swivel component can rotate relative to the base component when the release lever is forcibly pivoted away from the swivel component such that the locking protrusion is not inserted into a detent, and wherein the swivel component is rotatably affixed relative to the base component when protrusion is inserted into a detent.

2. The camera mount of claim 1, wherein the base component further comprises:
    a rippled washer coupled between the attachment mechanism and the release lever, the rippled washer comprising a contoured edge, a top face of the rippled washer component partially abutting the release lever; and
    an insert component designed to reciprocally couple to the screw component.

3. The camera mount of claim 1, wherein the release lever further comprises:
    a first end downwardly angled relative to a second end of the release lever, wherein the second end of the release lever comprises a hole for receiving the screw component.

4. The camera mount of claim 1, wherein the locking protrusion is substantially elevated on a first edge for holding the locking protrusion in the detent when inserted.

5. The camera mount of claim 1 wherein the attachment mechanism is a wrist clamp configured to attach to a reciprocal device on a wrist of a user.

6. The camera mount of claim 5, wherein the wrist clamp further comprises a cavity for receiving a rippled washer.

7. The camera mount of claim 5, wherein the release lever, when forcibly pivoted away from the swivel component, enters into a reciprocal cavity located on a top surface of the wrist clamp.

8. The camera mount of claim 1, wherein the plurality of detents on the bottom face are located along a circular path, each detent spaced equally along the circular path from an adjacent detent.

9. A camera mount comprising:
    a swivel component configured to couple to a camera system and comprising a bottom face including a plurality of detents on the bottom face; and
    a base component rotatably coupled to the swivel component and comprising:
        a release lever comprising an integral locking protrusion for insertion into one of the plurality of detents, the release lever configured to exert a compressive force into the bottom face of the swivel component;
    wherein the swivel component can rotate relative to the base component when the release lever is forcibly pivoted away from the swivel component in a released configuration, and wherein the swivel component is rotatably affixed relative to the base component when the locking protrusion is inserted into one of the plurality of detents in a locked configuration.

10. The camera mount of claim 9, further comprising:
a rippled washer component with a contoured edge and a top face of the rippled washer component partially abutting the release lever;
a screw component configured to rotatably couple the swivel component to the base component; and
an insert component designed to reciprocally couple to screw component.

11. The camera mount of claim 9, wherein the base component further comprises an attachment mechanism configured to couple the camera mount to an object or user.

12. The camera mount of claim 11, wherein the attachment mechanism further comprises a cavity for receiving a rippled washer.

13. The camera mount of claim 11, wherein the attachment mechanism is a wrist clamp, configured to attach to a reciprocal device on the wrist of a user.

14. The camera mount of claim 13, wherein the release lever, when forcibly pivoted away from the swivel component, enters into a reciprocal cavity located on a top surface of the wrist clamp.

15. The camera mount of claim 9, wherein the release lever is configured to protrude from the base component and further comprises:
a first end of the release lever, the first end downwardly angled relative to a second end of the release lever, wherein the second end of the release lever comprises a hole for receiving a screw component.

16. The camera mount of claim 9 wherein one of the plurality of detents on the bottom face comprises a continuous circular detent configured to receive the locking protrusion of the release lever at any point along the continuous circular detent.

17. A camera mount comprising:
a swivel component configured for connection to a camera system; and
a base component connected to the swivel component, the base component including a release lever extending outwardly therefrom that is resiliently deflectable between a locked position, in which the release lever inhibits relative movement between the swivel component and the base component, and an unlocked position, in which relative movement between the base component and the swivel component is allowed, wherein the swivel component includes a receipt structure configured to receive corresponding engagement structure included on the release lever, the engagement structure being configured for removal from the receipt structure during movement of the release lever from the locked position to the unlocked position, and configured for insertion into the receipt structure during movement of the release lever from the unlocked position to the locked position, wherein the receipt structure includes a series of detents, and the engagement structure includes a locking protrusion.

18. The camera mount of claim 17, wherein the locking protrusion is formed integrally with the release lever.

* * * * *